(12) United States Patent
Meng et al.

(10) Patent No.: US 11,143,812 B2
(45) Date of Patent: Oct. 12, 2021

(54) DISPLAY PANEL AND DISPLAY DEVICE

(71) Applicant: BOE TECHNOLOGY GROUP CO., LTD., Beijing (CN)

(72) Inventors: Xiandong Meng, Beijing (CN); Wei Wang, Beijing (CN); Jifeng Tan, Beijing (CN); Xianqin Meng, Beijing (CN); Fangzhou Wang, Beijing (CN); Qiuyu Ling, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/607,227

(22) PCT Filed: May 13, 2019

(86) PCT No.: PCT/CN2019/086647
§ 371 (c)(1),
(2) Date: Oct. 22, 2019

(87) PCT Pub. No.: WO2020/062884
PCT Pub. Date: Apr. 2, 2020

(65) Prior Publication Data
US 2020/0379163 A1     Dec. 3, 2020

(30) Foreign Application Priority Data
Sep. 28, 2018   (CN) .......................... 201811137329.7

(51) Int. Cl.
*F21V 8/00*     (2006.01)
*G02B 27/28*    (2006.01)
(Continued)

(52) U.S. Cl.
CPC ......... *G02B 6/0056* (2013.01); *G02B 6/0031* (2013.01); *G02B 6/0038* (2013.01);
(Continued)

(58) Field of Classification Search
CPC ......... G02F 2001/133548; G02F 2001/133538
See application file for complete search history.

(56) References Cited

U.S. PATENT DOCUMENTS

| 5,555,186 A | 9/1996 | Shioya |
| 2004/0125275 A1 | 7/2004 | Kurasawa |
(Continued)

FOREIGN PATENT DOCUMENTS

| CN | 1591120 A | 3/2005 |
| CN | 101042496 A | 9/2007 |
(Continued)

*Primary Examiner* — Alexander P Gross
(74) *Attorney, Agent, or Firm* — The Webb Law Firm

(57) ABSTRACT

The present disclosure relates to a display panel and a display device. The display panel includes: a beam splitting member disposed between a light extracting member and a liquid crystal layer, for splitting the light extracted from the light extracting member into linearly polarized lights with polarization directions perpendicular to each other; and a modulating member disposed on a side of the beam splitting member away from the light extracting member, for modulating the linearly polarized light that is incident from the beam splitting member into the liquid crystal layer.

15 Claims, 4 Drawing Sheets

(51) Int. Cl.
*G02F 1/1335* (2006.01)
*G02F 1/29* (2006.01)
*G02F 1/1343* (2006.01)

(52) U.S. Cl.
CPC ......... *G02B 6/0043* (2013.01); *G02B 6/0055* (2013.01); *G02B 27/283* (2013.01); *G02F 1/133512* (2013.01); *G02F 1/292* (2013.01); *G02F 1/133538* (2021.01); *G02F 1/133548* (2021.01); *G02F 1/134372* (2021.01)

(56) References Cited

U.S. PATENT DOCUMENTS

| | | | | |
|---|---|---|---|---|
| 2007/0046897 | A1* | 3/2007 | Hwang | H04N 9/3167 353/20 |
| 2012/0206678 | A1* | 8/2012 | Kim | G02F 1/133533 349/106 |
| 2012/0217529 | A1* | 8/2012 | Katayama | G02B 27/102 257/98 |
| 2013/0188106 | A1* | 7/2013 | Nishida | G02F 1/13306 349/33 |
| 2016/0070052 | A1* | 3/2016 | Masuda | G02B 6/0051 362/611 |
| 2016/0238887 | A1* | 8/2016 | Yao | G02F 1/133528 |
| 2016/0266299 | A1* | 9/2016 | Yoon | G02B 6/0026 |
| 2019/0086732 | A1 | 3/2019 | Wang | |
| 2020/0142247 | A1* | 5/2020 | Zhao | G02F 1/133514 |

FOREIGN PATENT DOCUMENTS

| | | | | |
|---|---|---|---|---|
| CN | 106526942 | A * | 3/2017 | ............ G02F 1/1337 |
| CN | 106773299 | A | 5/2017 | |
| CN | 107238974 | A | 10/2017 | |
| CN | 107367883 | A | 11/2017 | |
| CN | 107817629 | A | 3/2018 | |
| CN | 207179399 | U | 4/2018 | |
| CN | 107991783 | A | 5/2018 | |
| JP | 2004177672 | A | 6/2004 | |
| JP | 2008203293 | A | 9/2008 | |

* cited by examiner

DISPLAY PANEL AND DISPLAY DEVICE

CROSS-REFERENCE TO RELATED APPLICATIONS

This application is a U.S. National Stage Application under 35 U.S.C. § 371 of International Patent Application No. PCT/CN2019/086647, filed on May 13, 2019, which is based on and claims priority to CN Application No. 201811137329.7, filed on Sep. 28, 2018, the disclosures of both of which are incorporated into this application by reference in entirety.

TECHNICAL FIELD

The present invention relates to the field of display technologies, and in particular, to a display panel and a display device.

BACKGROUND

With the rapid development of display technologies, people have higher and higher requirements on the performance of display products. Display panel, as an important component of a display product, has received extensive attentions.

In related liquid crystal display schemes, the light provided by the backlight is natural light (including two kinds of polarized light), but the liquid crystal grating can only modulate one kind of polarized light. That is, the other kind of polarized light entering the liquid crystal cell cannot be utilized for display.

SUMMARY

According to a first aspect of the embodiments of the present disclosure, there is provided a display panel comprising: a beam splitting member disposed between a light extracting member and a liquid crystal layer, for splitting the light extracted from the light extracting member into linearly polarized lights with polarization directions perpendicular to each other; and a modulating member disposed on a side of the beam splitting member away from the light extracting member for modulating the linearly polarized light that is incident from the beam splitting member into the liquid crystal layer.

In some embodiments, the light extracting member comprises a light guide member with a plurality of light extraction regions disposed on a light emission surface of the light guide member.

In some embodiments, the beam splitting member comprises: a plurality of first reflective polarizers and a plurality of second reflective polarizers, light transmission axes of which are perpendicular to each other, alternately disposed at positions corresponding to different light extraction regions of plurality of light extraction regions.

In some embodiments, the first reflective polarizer and the second reflective polarizer split the light extracted from the different light extraction regions into first linearly polarized light and second linearly polarized light with polarization directions perpendicular to each other, wherein: the first reflective polarizer transmits the first linearly polarized light and reflects the second linearly polarized light; the second reflective polarizer reflects the first linearly polarized light and transmits the second linearly polarized light.

In some embodiments, the first linearly polarized light passing through the first reflective polarizer and the second linearly polarized light passing through the second reflective polarizer are incident to the liquid crystal layer along an original propagation direction; the first linearly polarized light passing through the second reflective polarizer and the second linearly polarized light passing through the first reflective polarizer are reflected back to the corresponding light extraction region.

In some embodiments, the beam splitting member comprises: alternately arranged polarization beam splitters and beveled mirrors, wherein the polarization beam splitters are disposed at corresponding positions of the light extraction regions of the light extracting member, the beveled mirrors are disposed at corresponding positions between adjacent light extraction regions with an inclined plane facing the polarization beam splitters, and a splitting plane of the polarization beam splitter is parallel to the inclined plane of the beveled mirror.

In some embodiments, the polarization beam splitter split the light extracted from the light extraction region into first linearly polarized light and second linearly polarized light with polarization directions perpendicular to each other, wherein: the first linearly polarized light propagates along an original propagation direction and is incident to the liquid crystal layer; the second linearly polarized light propagates in a direction perpendicular to the original propagation direction, is incident to and reflected by the inclined plane of the beveled mirror, and then incident to the liquid crystal layer.

In some embodiments, the modulating member comprises: a drive electrode and a pixel electrode, disposed between the beam splitting member and the liquid crystal layer, wherein the pixel electrode is closer to the liquid crystal layer than the drive electrode.

In some embodiments, the pixel electrode comprises: a first pixel electrode and a second pixel electrode arranged in directions perpendicular to each other, for respectively modulating the linearly polarized lights with polarization directions perpendicular to each other, which are incident into the liquid crystal layer.

In some embodiments, the first pixel electrode comprises a plurality of first electrodes arranged in a first direction, the second pixel electrode comprises a plurality of second electrodes arranged in a second direction, the second direction is perpendicular to the first direction, and the second direction and the first direction are both parallel to the light emission surface of the light guide member, the first linearly polarized light is polarized along the first direction, and the second linearly polarized light is polarized along the second direction.

In some embodiments, the first electrode and the second electrode are strip electrodes.

In some embodiments, the modulating member further comprises: a half-wave plate disposed between the beam splitting member and the drive electrode, for modulating the polarization directions of the first linearly polarized light and the second linearly polarized light with polarization directions perpendicular to each other from the beam splitting member to be the same.

In some embodiments, the half-wave plate is disposed at a corresponding position of the light extraction region of the light extracting member.

In some embodiments, the display panel further comprises: a support layer disposed between the light extracting member and the liquid crystal layer, for supporting the beam splitting member and the modulating member.

In some embodiments, the light guide member is a light guide plate, and the light extraction region is provided with a light extraction structure.

In some embodiments, the display panel further comprises: a light shielding layer disposed on a side of the liquid crystal layer away from the modulating member, wherein the light shielding layer comprises an array of light shielding units, and positions of the light shielding units correspond to the position of the beam splitting member.

In some embodiments, the display panel further comprises: a substrate disposed on a side of the liquid crystal layer away from the light extracting member.

According to a second aspect of the embodiments of the present disclosure, there is provided a display device comprising the aforementioned display panel.

In some embodiments, the display device further comprises: a light source; a curved reflecting member for reflecting light from the light source into the light extracting member; and a reflecting plane for reflecting light emitted from the light extracting member back to the light extracting member.

Other features of the present disclosure and their advantages will become apparent from the following detailed description of the embodiments of the present disclosure with reference to the accompanying drawings.

BRIEF DESCRIPTION OF THE DRAWINGS

The accompanying drawings, which are incorporated in and constitute a part of this specification, illustrate embodiments of the present disclosure and together with the description, serve to explain the principles of the present disclosure.

The present disclosure will become more fully understood from the detailed description given below with reference to the accompanying drawings, wherein.

It should be understood that the dimensions of the various parts illustrated in the drawings are not drawn to scale. Further, the same or similar reference numerals denote the same or similar members.

DETAILED DESCRIPTION

Various embodiments of the present disclosure will now be described in detail with reference to the accompanying drawings. The description of the embodiments is merely illustrative and is in no way intended to limit the present disclosure, and its application or use. The present disclosure may be embodied in many different forms and is not limited to the embodiments described herein. These embodiments are provided so that this disclosure will be thorough and complete, and will fully convey the scope of the disclosure to those skilled in the art. It should be noted that: unless specifically stated otherwise, the relative arrangement of the parts and steps set forth in the embodiments is to be construed as illustrative only and not as restrictive.

The use of "first," "second," and similar words in this disclosure does not denote any order, quantity, or importance, but rather distinguish one element from another. The word "comprising" and the like means that an element before the word includes the elements as listed after the word, and does not exclude the possibility of also including other elements. "upper", "lower", "left", "right", etc. are used only to indicate relative positional relationships, which may also change accordingly when the absolute position of the described object changes.

In the present disclosure, when it is described that a specific element is located between a first element and a second element, an intervening element may or may not be present between the specific element and the first element or the second element.

All terms (including technical or scientific terms) used in the present disclosure have the same meaning as commonly understood by one of ordinary skill in the art to which the present disclosure pertains, unless otherwise specifically defined. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Techniques, methods, and apparatus known to those of ordinary skill in the relevant art may not be discussed in detail, but are to be considered a part of the specification where appropriate.

In related liquid crystal display solutions, polarized light which cannot be modulated by the liquid crystal grating will be directly absorbed by a light shielding layer during display and thus cannot be utilized, so that at least half of the light energy is lost, which cannot adapt to the requirements of display scenes (such as transparent display) requiring high light efficiency.

In view of this, the present disclosure provides a technical solution capable of improving the light efficiency of liquid crystal display.

Figure 1:
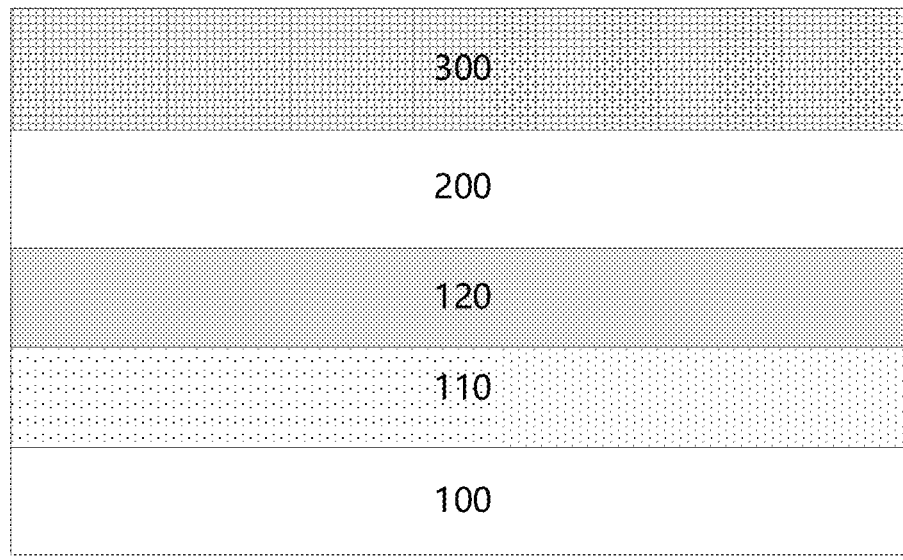
FIG. 1 is a schematic diagram showing a structure of a display panel according to an embodiment of the present disclosure.

FIG. 1 is a schematic diagram showing a structure of a display panel according to an embodiment of the present disclosure. As shown in FIG. 1, the display panel comprises a beam splitting member 110 and a modulating member 120 disposed between a light extracting member 100 and a liquid crystal layer 200.

The beam splitting member 110 and the modulating member 120 are both located above a light extracting member 100. The beam splitting member 110 is located on a light emission side of the light extracting member 100, for splitting the light extracted from the light extracting member 100 into linearly polarized lights with polarization directions perpendicular to each other.

The modulating member 120 is disposed on a side of the beam splitting member 110 away from the light extracting section 100, i.e., on a light emission side of the beam splitting member 110, for modulating the linearly polarized light that is incident from the beam splitting member 110 into the liquid crystal layer 200.

The liquid crystal layer 200 is disposed between an upper substrate and a lower substrate. The upper substrate 300 may be a glass substrate. The light extracting member 100 may also serve as the lower substrate. The liquid crystal layer 200 may employ a conventional liquid crystal material. The liquid crystal layer 200 may be arranged correspondingly to the electric field generated by electrodes, resulting in a difference in phase of light incident thereto, and thereby achieving a diffraction effect, i.e., forming a liquid crystal grating. The liquid crystal is a birefringent crystal with two refractive index values. In some embodiments, the liquid crystal material with a larger refractive index difference may be selected to ensure that the thus-formed liquid crystal grating has a high diffraction efficiency.

Different drive voltages are applied to the liquid crystal, to form liquid crystal gratings with different morphologies. That is, by applying different drive voltage signals to the liquid crystal, different diffraction efficiencies of the liquid crystal grating with respect to the incident light, and multi-gray-scale display in a bright state can be realized.

In the above embodiments, by means of the beam splitting member and the modulating component, all polarized light of the backlight (e.g., natural light) can be used for display, which can significantly improve the light efficiency of the display.

Figure 2:
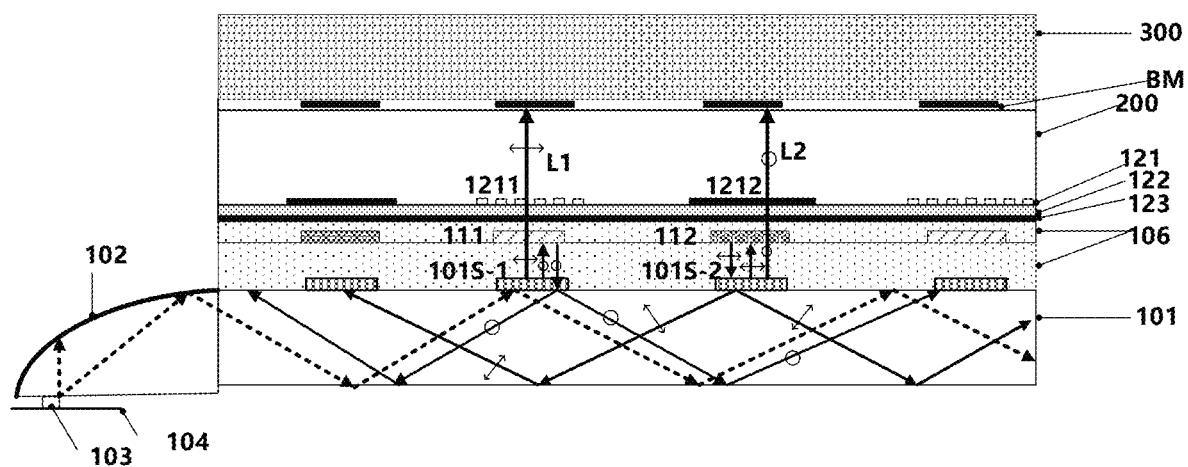
FIG. 2 is a schematic diagram showing a structure of a display device according to an embodiment of the present disclosure.

FIG. 2 is a schematic diagram showing a structure of a display device according to an embodiment of the present disclosure. As shown in FIG. 2, the display device comprises a display panel and a light source assembly.

The display panel comprises a light guide member 101, a light extraction structure 101S, a support layer 106, a first reflective polarizer 111, a second reflective polarizer 112, a pixel electrode 121, an insulating layer 122, a drive electrode 123, a liquid crystal layer 200, a light shielding layer BM, and an upper substrate 300. The light source assembly comprises: a curved reflecting member 102, a light source 103, and a reflective plane 104.

The light guide member 101 and the light extraction structure 101S provided at the light extraction region of the light emission surface of the light guide member 101 constitute a light extracting member. The light guide member 101 may take the form of a light guide plate having high transparency and flat upper and lower surfaces. The light guide plate may be a glass substrate such as PMMA (polymethyl methacrylate) plexiglass. The light guide plate can also serve as a lower substrate.

The light extraction structure 101S is used to extract light from the light guide member 100, for example, extract approximately collimated light. The light extraction structure may include, but is not limited to, a grating, whereby light can be extracted from the light guide member using the diffraction function of the grating.

In some embodiments, the light extraction gratings are arranged on the upper surface (i.e., light emission surface) of the light guide plate at certain intervals, wherein each light extraction region on the light guide plate is provided with one light extraction grating. The material of the light extraction grating can be SiNx, Indium Tin Oxide (ITO), photoresist, or the like. Of course, the grating structure may also be directly etched on the upper surface of the light guide plate.

The light extracting grating is used for extracting light rays which are totally reflected and transmitted in the light guide plate in a diffractive and approximately collimated manner. The line width and height of the light extracting grating are related to the diffraction efficiency of the grating, and can be obtained by using grating design software (such as rsoft, FDTD, Virtuallab, etc.) according to actual needs. The period of the light extraction grating can be designed according to the following equation:

$$n_1 \sin \theta_1 - n_2 \sin \theta_2 = m\lambda/P,$$

where P represents a period of the grating, $n_1$ represents a refractive index of the medium where the incident light of the grating is located, $n_2$ represents a refractive index of the medium where the diffracted light of the grating is located, $\theta_1$ represents an incident angle, $\theta_2$ represents a diffraction angle, and $\lambda$ represents a wavelength of the light.

The curved reflecting member 102 is used to reflect light from the light source 103 into the light guide member 101. The curved reflecting member 102 may be, for example, a parabolic mirror or a spherical mirror. The curved reflecting member may be made of a resin material.

In some embodiments, the curved reflecting member 102 couples the light emitted from the light source 103 into the light guide member 101 (e.g., a light guide plate) at a specific angle, so that the light is totally reflected and transmitted therein. As shown in FIG. 2, the light indicated by the dotted lines represents unpolarized light emitted from the light source 103, which is reflected into the light guide member 101 through the curved reflecting member 102, and propagates in the light guide member 101 by total reflection.

For example, a relative position between the curved reflecting member 102 and the light guide member 101 may be set such that the light reflected by the curved reflecting member 102 is incident into the light guide member 101 at an incident angle greater than a total reflection angle of the light guide member 101. The relative position between the curved reflecting member 102 and the light guide member 101 can be further adjusted so that more light enters the light guide member 101 to further improve the light efficiency (i.e., the light utilization efficiency). In addition, the total reflection angle of the light guide member 100 may be adjusted also by adjusting the refractive index of the light guide member 101, for example, selecting a light guide plate including a different material.

Since an LED (Light Emitting Diode) has advantages of a small size, emission of monochromatic light, and a narrow spectral width, the light source 103 may employ an LED. In some embodiments, the light source 103 is a monochromatic micro LED, a monochromatic micro OLED (micro Organic Light Emitting Diode), or a monochromatic laser light source.

The reflective plane 104 is located on the lower surface of the light source 103. The reflective plane can reflect the light emitted from the light guide member back to the light guide member, so as to further improve the light efficiency.

As shown in FIG. 2, the support layer 106 is disposed between the light guide member 101 and the liquid crystal layer 200, above the light guide member 101 (light emission side), for supporting the beam splitting member 110 and the modulating member 120. In some embodiments, the support layer comprises a resin layer. The use of the resin layer as the support layer not only can provide a flat support surface, but also can protect the light extraction grating.

The light extraction grating can be used to extract the light propagating in the light guide member upwards in an approximately collimated manner. In the embodiment shown in FIG. 2, the diffraction angle $\theta_2$ is equal to zero, $n_2$ denotes the refractive index of the support layer, $n_1$ denotes the refractive index of the light guide member, and $\theta_1$ denotes the propagation angle of light within the light guide member. In some embodiments, the support layer is a low refractive index resin material. The use of a low refractive index material can guarantee optical characteristics of adjacent members of the support layer, i.e., satisfying $n_1 \sin \theta_1 - n_2\theta_2 = m\lambda/P$.

As shown in FIG. 2, the first reflective polarizer 111 and the second reflective polarizer 112, transmission axes of which are perpendicular to each other, constitute the beam splitting member. The first reflective polarizer 111 and the second reflective polarizer 112 are alternately arranged at positions corresponding to different light extraction regions of the light guide member 101, for example, alternately arranged above different light extraction gratings 101S. Here, "corresponding" means that orthographic projections of the reflective polarizer and the light extraction region on the light emission surface of the light guide member at least partially overlap.

Figure 3:
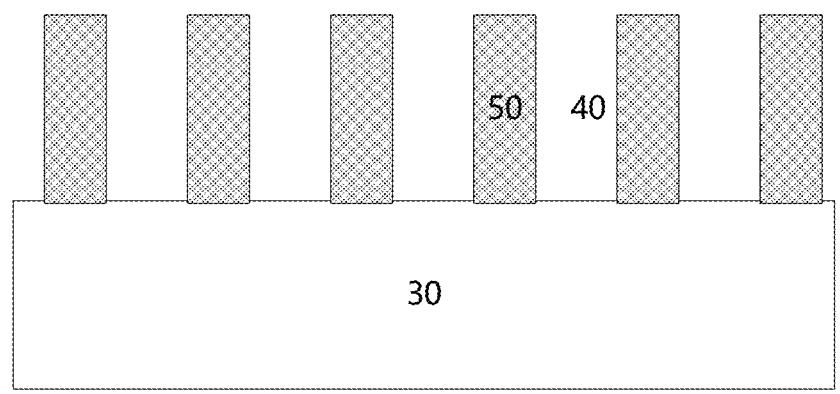
FIG. 3 is a schematic diagram showing a structure of a beam splitting member according to an embodiment of the present disclosure.

FIG. 3 shows is a schematic diagram showing a structure of a beam splitting member according to one embodiment of the present disclosure.

The reflective polarizer shown in FIG. 3 is a beam-splitting type Wire Grid Polarizer (WGP). The beam-splitting type WGP is capable of splitting an incident light beam (e.g., natural light) into two different linearly polarized light beams with polarization directions perpendicular to each other (i.e., orthogonally polarized). When the natural light is incident through the reflective polarizer, light of one polarization state can be transmitted in the original direction, and light of the other polarization state with a polarization direction perpendicular thereto will be reflected. As shown in FIG. 3, the beam-splitting type WGP is a metal grid 50 having nano-scale slits 40 formed on a substrate 30. In some embodiments, the substrate may be a glass substrate. The metal may be Al. The width, thickness and pitch of the metal grid can be set according to actual needs. For example, the pitch of the metal grid may be set within 200 nm.

It should be understood that the reflective polarizer may also be implemented by using DBEF (dual brightness enhancement film), nano-structured dielectric grating with polarization selectivity, etc., according to actual needs.

Next return to FIG. 2 to describe the first reflective polarizer 111 and the second reflective polarizer 112. As shown in FIG. 2, the light extracted from different light extraction gratings is split into first linearly polarized light L1 (i.e., light horizontally polarized parallel to the paper surface and indicated by solid lines with double arrows) and second linearly polarized light L2 (i.e., light vertically polarized perpendicular to the paper surface and indicated by solid lines with a circle) with polarization directions perpendicular to each other after passing through the first reflective polarizer 111 and the second reflective polarizer 112, respectively. Specifically, the light extracted from the light extraction grating 101S-1 is split into first linearly polarized light L1 and second linearly polarized light L2 with polarization directions perpendicular to each other after passing through the first reflective polarizer 111. The light extracted from the light extraction grating 101S-2 is also split into first linearly polarized light L1 and second linearly polarized light L2 with polarization directions perpendicular to each other after passing through the second reflective polarizer 112. For the light extracted from different light extraction gratings, a ratio of the first linearly polarized light to the second linearly polarized light may be different.

In some embodiments, the first reflective polarizer transmits the first linearly polarized light and reflects the second linearly polarized light; and the second reflective polarizer reflects the first linearly polarized light and transmits the second linearly polarized light.

As shown in FIG. 2, the first linearly polarized light L1 passing through the first reflective polarizer 111 and the second linearly polarized light L2 passing through the second reflective polarizer 112 continue to propagate along the original propagation direction and then are incident on the liquid crystal layer 200. In contrast, the first linearly polarized light L1 passing through the second reflective polarizer 112 and the second linearly polarized light L2 passing through the first reflective polarizer 111 are reflected back to the original light extraction gratings, i.e., back to the light extraction gratings 101S-2 and 101S-1, respectively, so as to re-enter the light guide member 101. The light reflected back to the light guide member 101 can be extracted by other light extraction gratings for reuse. For example, as shown in FIG. 2, the first linearly polarized light L1 returned from the light extraction grating 101S-1 to the light guide member 101 reaches a certain light extraction grating (not shown in the figure) by total reflection, is extracted from the light extraction grating, and is incident on the liquid crystal layer through the second reflective polarizer above the light extraction grating. This may further improve the light efficiency.

Figure 4:
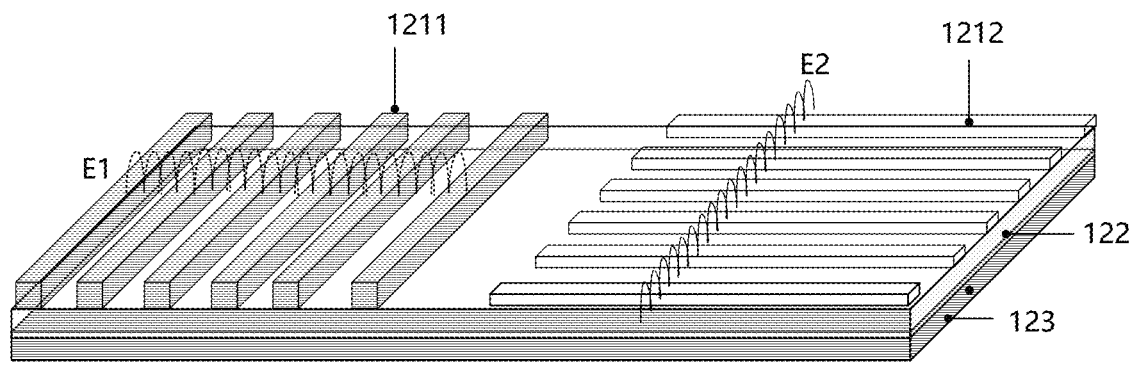
FIG. 4 is a schematic diagram showing a structure of a modulating member according to an embodiment of the present disclosure.

By adopting the above structure of the beam splitting member, the two kinds of polarized light orthogonally polarized can be extracted from different light extracting regions in an approximately collimated manner. How to sufficiently utilize the linearly polarized light of different polarization directions for liquid crystal display will be described below with reference to FIGS. 2 and 4. FIG. 4 is a schematic diagram showing a structure of a modulating member according to some embodiments of the present disclosure.

FIG. 2 shows that the modulating member comprises a pixel electrode 121 and a drive electrode 123. As shown in FIG. 2, the pixel electrode 121 and the drive electrode 123 are disposed between the beam splitting member (i.e., the first and second reflective polarizers 111 and 112) and the liquid crystal layer 200. The pixel electrode 121 is closer to the liquid crystal layer 200 than the drive electrode 123, i.e., the pixel electrode 121 is located above the drive electrode 123. FIG. 2 shows that the pixel electrode 121 and the drive electrode 123 are disposed on a side of the liquid crystal layer 200 close to the beam splitting member, i.e., below the liquid crystal layer. It will be appreciated that the pixel electrode and the drive electrode may also be disposed on a side of the liquid crystal layer away from the beam splitting member, i.e. above the liquid crystal layer.

As shown in FIG. 2, the pixel electrode 121 and the drive electrode 123 are separated by an insulating layer 122. In some embodiments, the drive electrode and the pixel electrode are both made of a light-transmitting (or transparent) material, for example, ITO electrodes may be used.

By disposing the pixel electrode 121 and the drive electrode 123 on the same side of the liquid crystal layer 200, a liquid crystal grating can be formed using a fringe field effect, thereby achieving high light transmission efficiency. It should be understood that the pixel electrode and the drive electrode may also be disposed on both sides of the liquid crystal layer according to actual needs. In that case, no insulating layer will be needed to separate the pixel electrode from the drive electrode.

The pixel electrode 121 includes a first pixel electrode 1211 and a second pixel electrode 1212. The first and second pixel electrodes 1211 and 1212 are alternately disposed at corresponding positions of the first and second reflective polarizers 111 and 112. Here, "corresponding" means that orthographic projections of the first pixel electrode and the first reflective polarizer on the light emission surface of the light guide member at least partially overlap, and orthographic projections of the second pixel electrode and the second reflective polarizer on the light emission surface of the light guide member at least partially overlap.

As can be seen from FIG. 2: the first pixel electrode 1211 and the second pixel electrode 1212 are alternately disposed above the first reflective polarizer 111 and the second reflective polarizer 112, i.e., the first pixel electrode 1211 is disposed above the first reflective polarizer 111 and the second pixel electrode 1212 is disposed above the second reflective polarizer 112.

The light shielding layer BM is provided on a side of the liquid crystal layer 200 away from the modulating member 120, for example, on the upper substrate 300, as shown in FIG. 2. The light shielding layer BM may be made of a metal thin film or a light-shielding resin material for absorbing light. The light shielding layer BM may include an array of light shielding units, each light shielding unit in the array being separated by a light-transmitting material which may be, for example, a color filter layer. The position of the light shielding unit corresponds to the position of the beam splitting member. As shown in FIG. 2, the position of the light shielding unit corresponds to the positions of the first and second reflective polarizers. Here, "corresponding" means that orthographic projections of the light shielding unit and the first or second reflective polarizer on the light emission surface of the light guide member at least partially overlap.

In some embodiments, the light emitted from the liquid crystal layer is absorbed by the light shielding layer. For example, when a drive voltage is not applied to the liquid crystal layer, the light emitted from the liquid crystal layer will be absorbed by the light shielding layer, and a dark state of display can be realized.

As described above, the modulating member is used for modulating the linearly polarized light that is incident from the beam splitting member into the liquid crystal layer. For example, the modulating member is used to modulate at least part of the linearly polarized light incident from the beam splitting member into the liquid crystal layer in a bright state to be deviated from the light shielding layer BM. The modulation here can be achieved by diffraction or by refraction. It is known for diffractive modulation that the liquid crystal grating formed by one kind of electrode arrangement can only perform diffractive modulation on one kind of linearly polarized light for use in display. FIG. 4 shows two kinds of electrode arrangements for performing the diffractive modulation on two kinds of linearly polarized light.

As shown in FIG. 4, the arrangement directions of the first pixel electrode 1211 and the second pixel electrode 1212 are perpendicular to each other. The first pixel electrode 1211 includes a plurality of first electrodes arranged in a first direction. The second pixel electrode 1212 includes a plurality of second electrodes arranged in a second direction. The second direction is perpendicular to the first direction, and the second direction and the first direction are both parallel to the light emission surface of the light guide member.

As shown in FIG. 4, the first direction is parallel to the paper surface and the second direction is perpendicular to the paper surface. In case where the first electrode and the second electrode are both strip electrodes, the first direction is parallel to the strip extending direction of the second electrode, and the second direction is parallel to the strip extending direction of the first electrode.

FIG. 4 also shows distributions of electric field lines E1 and E2 under two kinds of electrode arrangements. Since the electric field lines E1 and E2 are perpendicular to each other, the arrangement of the formed liquid crystal gratings will also be perpendicular to each other. Under the action of such an electric field, all of the linearly polarized lights incident on the liquid crystal layer 200 with polarization directions perpendicular to each other can be diffracted to be deviated from the light shielding layer BM. Specifically, since the first linearly polarized light L1 is polarized in the first direction and the second linearly polarized light L2 is polarized in the second direction, the first linearly polarized light L1 incident into the liquid crystal layer 200 can be diffracted to be deviated from the light shielding layer BM by using the first pixel electrode 1211; and the second linearly polarized light L2 incident into the liquid crystal layer 200 can be diffracted to be deviated from the light shielding layer BM by using the second pixel electrode 1212.

By making the arrangement directions of the two kinds of pixel electrodes perpendicular to each other, two liquid crystal gratings with different topographies can be formed, to respectively diffract and scatter the corresponding linearly polarized light to be deviated from the light shielding layer BM, so that display can be realized. In addition, the diffraction light efficiency of the liquid crystal grating is different under a different drive voltage. Therefore, different gray scales can be realized by adjusting the drive voltage.

Based on the backlight design and the electrode design of the liquid crystal grating in the above embodiments, all the polarized light of the backlight (e.g., natural light) can be used for display, thereby significantly improving the light efficiency.

Figure 5:
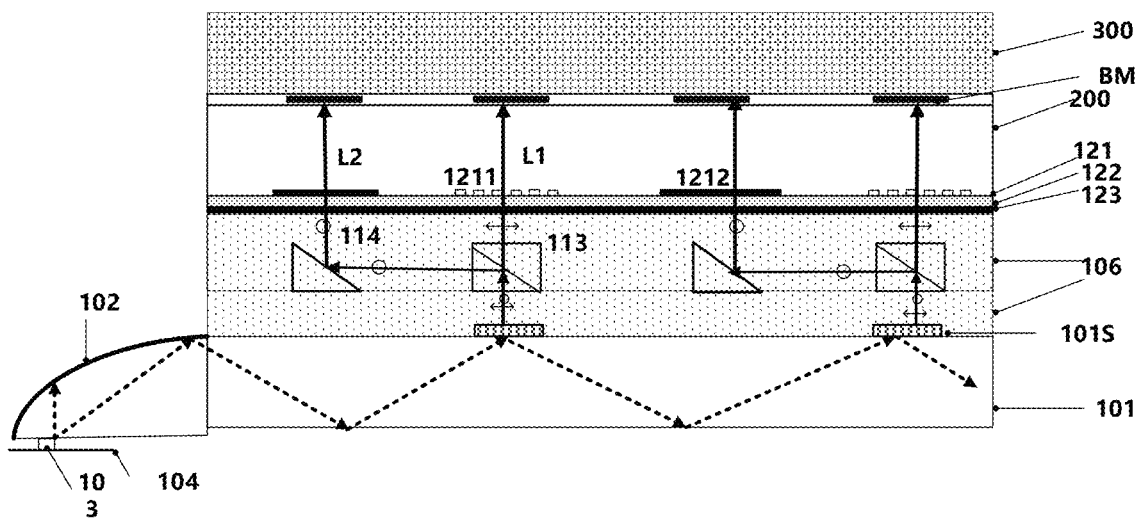
FIG. 5 is a schematic diagram showing a structure of a display device according to another embodiment of the present disclosure.

FIG. 5 shows is schematic diagram showing a structure of a display device according to another embodiment of the present disclosure. FIG. 5 differs from FIG. 2 in that the beam splitting member is implemented differently. Only differences therebetween will be described below, and the same will not be repeated herein.

As shown in FIG. 5, the beam splitting member includes: polarization beam splitters 113 and beveled mirrors 114 alternately arranged above the light guide member 101. The polarization beam splitter 113 is located at a position corresponding to the light extraction region of the light guide member 101, for example, above the light extraction grating 101S. The beveled mirror 114 is disposed between adjacent light extraction regions and not above the light extraction regions. The inclined plane of the beveled mirror 114 faces the polarization beam splitter 113 and is parallel to the spectroscopic surface of the polarization beam splitter 113.

As shown in FIG. 5, the position of the light shielding unit corresponds to the positions of the polarization beam splitter and the beveled mirror. Here, "corresponding" means that orthographic projections of the light shielding unit and the polarization beam splitter or the beveled mirror on the light emission surface of the light guide member at least partially overlap.

Figure 6:
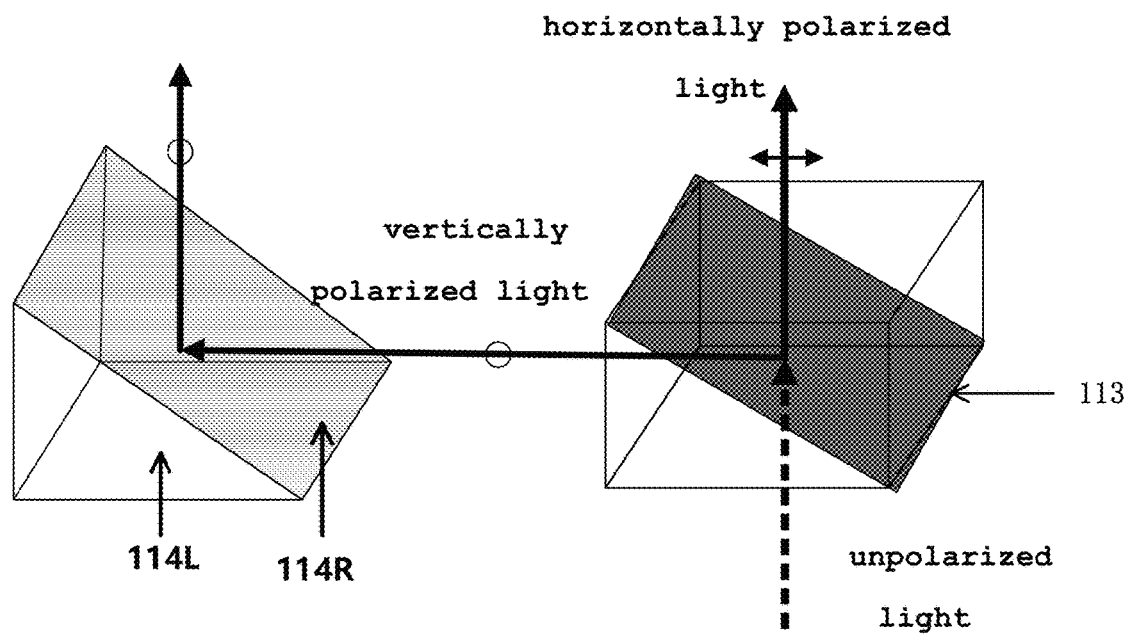
FIG. 6 is a schematic diagram showing a structure of a beam splitting member according to another embodiment of the present disclosure.

FIG. 6 is a schematic diagram showing a structure of a beam splitting member according to another embodiment of the present disclosure.

As shown in FIG. 6, the polarization beam splitter 113 may be formed by gluing a pair of high-precision right-angle prisms, wherein a polarization spectroscopic dielectric film is plated on an inclined plane of one prism. The inclined plane plated with the polarization spectroscopic dielectric film is the spectroscopic plane of the polarization beam splitter. The polarization beam splitter can split the incident unpolarized light into two vertical linearly polarized lights, wherein one polarized light completely passes through, the other polarized light is reflected at an angle of 45 degrees, and the light emission direction is deflected by an angle of 90 degrees. That is, one polarized light (e.g., light horizontally polarized parallel to the paper surface, i.e., horizontally polarized light) does not change the original propagation direction after passing through the polarization beam splitter, while the other polarized light (e.g., light vertically polarized perpendicular to the paper surface, i.e., vertically polarized light) will be vertically deflected in its propagation direction after passing through the polarization beam splitter, as shown in FIG. 6.

The beveled mirror 114 may be composed of a microprism 114L and a reflective layer 114R on the inclined plane thereof, and is used to adjust the propagation direction of the linearly polarized light that is vertically deflected after passing through the polarization beam splitter. As shown in FIG. 6, the beveled mirror 114 adjusts the propagation direction of the vertically polarized light back to the original propagation direction through the function of reflection, i.e., consistent with the propagation direction of the horizontally polarized light.

Next return to FIG. 5 to describe the polarization beam splitter 113 and the beveled mirror 114. As shown in FIG. 5, the light extracted from the light extraction grating 101S is split into first linearly polarized light L1 and second linearly polarized light L2 with polarization directions perpendicular to each other after passing through the polarization beam splitter 113.

As can also be seen from FIG. 5, the first linearly polarized light L1 continues to propagate along the original propagation direction and is then incident on the liquid crystal layer 200. In contrast, the second linearly polarized light L2 propagates in a direction perpendicular to the original propagation direction, is incident on the inclined plane of the beveled mirror 114, is adjusted as being propagated in the original propagation direction after being reflected, and is then incident on the liquid crystal layer 200 for display. As shown in FIG. 5, the propagation direction may also be described as a direction parallel to the upper surface of the light guide plate. Under the combined action of the polarization beam splitter and the beveled mirror, the two kinds of polarized light orthogonally polarized can be extracted from different light extraction regions in an approximately collimated manner, namely all the polarized light in regions are extracted.

Figure 7:
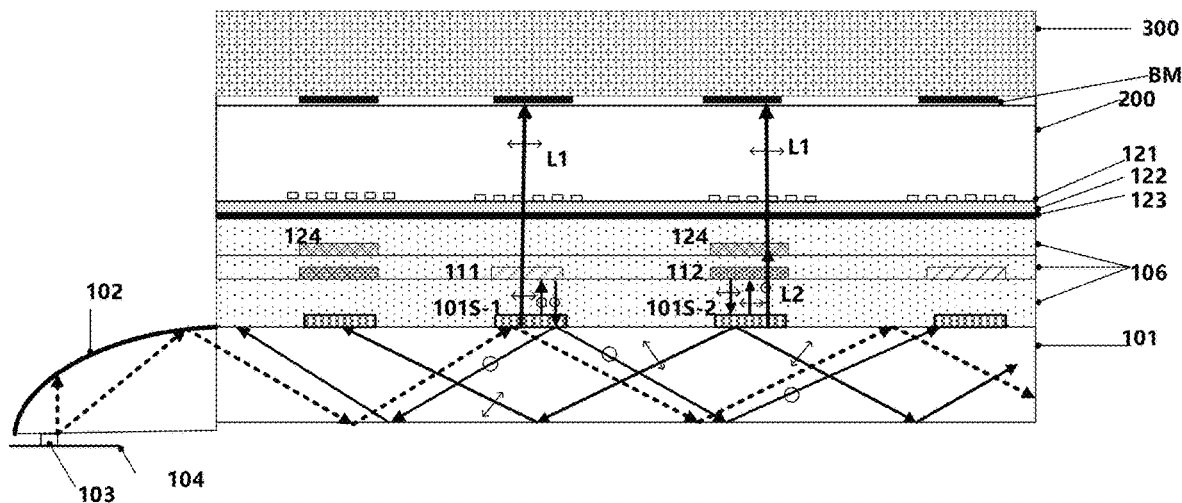
FIG. 7 is a schematic diagram showing a structure of a display device according to yet another embodiment of the present disclosure.

FIG. 7 is a schematic diagram showing a structure of a display device according to still another embodiment of the present disclosure. FIG. 7 differs from FIG. 2 in that the modulating member is implemented differently. Only differences therebetween will be described below, and the same will not be repeated herein.

As shown in FIG. 7, the modulating member 120 further includes a half-wave plate 124. The half-wave plate can rotate the vibration plane of the linearly polarized light such that the incident light is a linearly polarized light with one polarization direction and the transmitted light is the other linearly polarized light orthogonally polarized.

The half-wave plate is disposed between the beam splitting member and the drive electrode, for modulating the polarization directions of linearly polarized light with polarization directions perpendicular to each other from the beam splitting member to be the same. The half-wave plate may be disposed on the light emission side of the first linearly polarized light, and as shown in FIG. 7, a half-wave plate 124 may be disposed above the first reflective polarizer 111. Of course, the half-wave plate may also be disposed on the light emission side of the second linearly polarized light, for example, above the second reflective polarizer 112. In the embodiment of FIG. 7, the half-wave plate is disposed at a corresponding position of the light extraction region of the light guide member, for example, above the light extraction region.

By using the half-wave plate, the polarization directions of different linearly polarized lights from the beam splitting member can be modulated to be the same, so that it is not needed to alternately arrange two kinds of pixel electrodes any more, and only one electrode arrangement is needed for using all polarized lights of the backlight for display.

Figure 8:
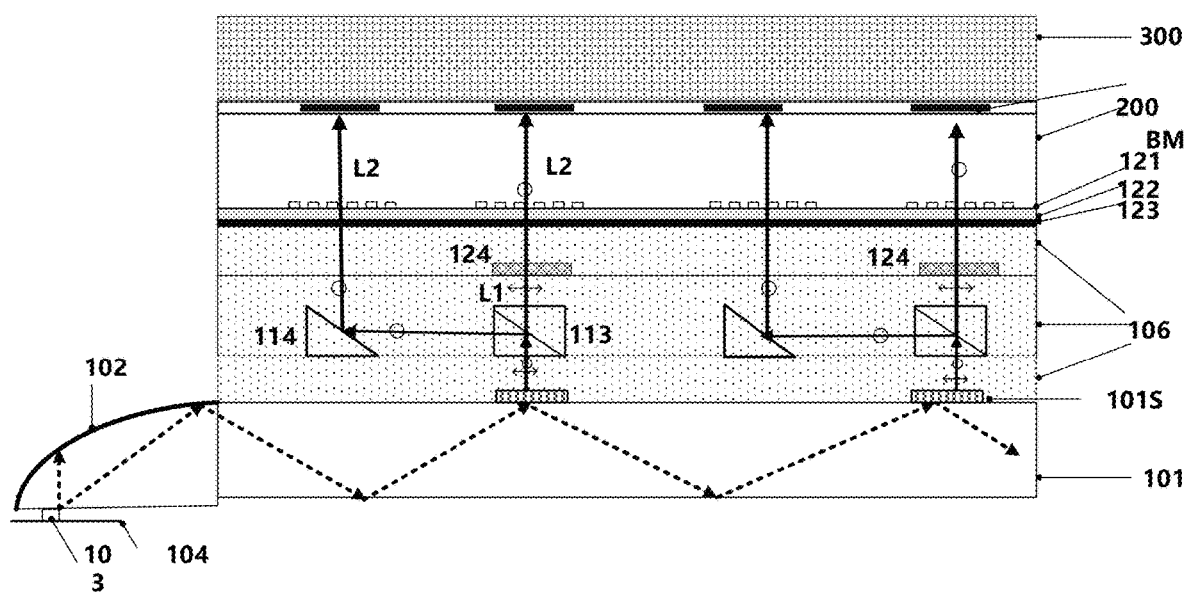
FIG. 8 is a schematic diagram showing a structure of a display device according to still another embodiment of the present disclosure.

FIG. 8 is a schematic diagram showing a structure of a display device according to still another embodiment of the present disclosure.

FIG. 8 differs from FIG. 7 in that the beam splitting member is implemented differently. Accordingly, the half-wave plate in the present embodiment may be disposed above the polarization beam splitter or the beveled mirror, instead of above the first or second reflective polarizer. As shown in FIG. 8, the half-wave plate 124 is disposed above the polarization beam splitter 113. It can be seen that if the half-wave plate is disposed above the beveled mirror, the half-wave plate is not located at the corresponding position of the light extraction region of the light guide member. That is, the half-wave plate is not necessarily provided at the corresponding position of the light extraction region of the light guide member.

FIG. 8 is similar to FIG. 3 in the implementation of the beam splitting member and similar to FIG. 7 in the implementation of the modulating member. The structure of the display panel shown in FIG. 8 is clear in conjunction with FIGS. 3 and 7 and the above description, and thus is not repeated herein.

It should be understood that, in the above embodiments, the light extraction region, the first reflective polarizer, the second reflective polarizer, the polarization beam splitter, the beveled mirror, the first pixel electrode, and the second pixel electrode may be provided in plurality.

The display panel according to the embodiment of the present disclosure can be widely used in the fields with higher light effect requirements, such as the fields of transparent display, AR/VR display, directional display, micro-nano optics and the like. Moreover, with the use of the display panel according to the embodiment of the present disclosure, polarizers are not required to be disposed on both sides of the liquid crystal layer, so that the structure and the process can be simplified.

According to an embodiment of the disclosure, there is also provided a display device comprising the aforementioned display panel. In some embodiments, the display device may be: mobile phone, tablet computer, television set, display, notebook computer, digital photo frame, navigator and any product or component with display function.

Thus far, various embodiments of the present disclosure have been described in detail. Some details well known in the art are not described in order to avoid obscuring the concepts of the present disclosure. Those skilled in the art can fully understand how to implement the technical solutions disclosed herein based on the above description.

While certain specific embodiments of the present disclosure have been described in detail by way of example, it should be understood by those skilled in the art that the above examples are illustrative only and are not intended to limit the scope of the present disclosure. It will be understood by those skilled in the art that modifications may be made to the above embodiments or equivalents may be substituted for partial technical features thereof without departing from the scope and spirit of the present disclosure. The scope of the present disclosure is defined by the appended claims.

What is claimed is:

1. A display panel comprising:
   a beam splitting member disposed between a light extracting member and a liquid crystal layer, for splitting a light extracted from the light extracting member into linearly polarized lights with polarization directions perpendicular to each other, the linearly polarized lights comprising a first linearly polarized light and a second linearly polarized light; and
   a modulating member disposed between the beam splitting member and the liquid crystal layer, and on a side of the beam splitting member away from the light extracting member for modulating the linearly polarized lights that are incident from the beam splitting member into the liquid crystal layer,
   wherein the modulating member comprises a drive electrode and a pixel electrode, which are disposed between the beam splitting member and the liquid crystal layer, and
   wherein the pixel electrode is closer to the liquid crystal layer than the drive electrode and the pixel electrode comprises a first pixel electrode and a second pixel electrode arranged in directions perpendicular to each other, for respectively modulating the linearly polarized lights with polarization directions perpendicular to each other, which are incident into the liquid crystal layer, wherein the first pixel electrode is configured to diffract the first linearly polarized light incident into the liquid crystal layer to deviate from a light shielding layer, and the second pixel electrode is configured to diffract the second linearly polarized light incident into the liquid crystal layer to deviate from the light shielding layer.

2. The display panel according to claim 1, further comprising: a support layer disposed between the light extracting member and the liquid crystal layer, for supporting the beam splitting member and the modulating member.

3. The display panel according to claim 1, further comprising: the light shielding layer disposed on a side of the liquid crystal layer away from the modulating member, wherein the light shielding layer comprises an array of light shielding units, and positions of the array of light shielding units correspond to a position of the beam splitting member.

4. The display panel according to claim 1, further comprising: a substrate disposed on a side of the liquid crystal layer away from the light extracting member.

5. The display panel according to claim 1, wherein the first pixel electrode comprises a plurality of first electrodes arranged in a first direction, the second pixel electrode comprises a plurality of second electrodes arranged in a second direction, the second direction is perpendicular to the first direction, and the second direction and the first direction are both parallel to the light emission surface of the light guide member, the first linearly polarized light is polarized along the first direction, and the second linearly polarized light is polarized along the second direction.

6. The display panel according to claim 5, wherein the plurality of first electrodes and the plurality of second electrodes are strip electrodes.

7. A display device comprising the display panel according to claim 1.

8. The display device according to claim 7, further comprising:
   a light source;
   a curved reflecting member for reflecting light from the light source into the light extracting member; and
   a reflecting plane for reflecting light emitted from the light extracting member back to the light extracting member.

9. The display panel according to claim 1, wherein the light extracting member comprises a light guide member with a plurality of light extraction regions on a light emission surface of the light guide member.

10. The display panel according to claim 9, wherein the light guide member is a light guide plate, and wherein each of the plurality of light extraction regions is provided with a light extraction structure.

11. The display panel according to claim 9, wherein the beam splitting member comprises: alternately arranged polarization beam splitters and beveled mirrors, wherein the polarization beam splitters are disposed at corresponding positions of the plurality of light extraction regions of the light extracting member, the beveled mirrors are disposed at corresponding positions between adjacent light extraction regions with an inclined plane facing the polarization beam splitters, and a splitting plane of the polarization beam splitters is parallel to the inclined plane of the beveled mirrors.

12. The display panel according to claim 11, wherein the polarization beam splitters split the light extracted from the plurality of light extraction regions into a first linearly polarized light and a second linearly polarized light with polarization directions perpendicular to each other, wherein:
   the first linearly polarized light propagates along an original propagation direction and is incident to the liquid crystal layer;
   the second linearly polarized light propagates in a direction perpendicular to the original propagation direction, is incident to and reflected by the inclined plane of the beveled mirrors, and then incident to the liquid crystal layer.

13. The display panel according to claim 9, wherein the beam splitting member comprises: a plurality of first reflective polarizers and a plurality of second reflective polarizers, light transmission axes of which are perpendicular to each other, alternately disposed at positions corresponding to different light extraction regions of the plurality of light extraction regions.

14. The display panel according to claim 13, wherein a first reflective polarizer of the plurality of first reflective polarizers and a second reflective polarizer of the plurality of second reflective polarizers split the light extracted from the different light extraction regions into the first linearly polarized light and the second linearly polarized light with polarization directions perpendicular to each other, wherein:
   the first reflective polarizer transmits the first linearly polarized light and reflects the second linearly polarized light;
   the second reflective polarizer reflects the first linearly polarized light and transmits the second linearly polarized light.

15. The display panel according to claim 14, wherein:
   the first linearly polarized light passing through the first reflective polarizer and the second linearly polarized light passing through the second reflective polarizer are incident to the liquid crystal layer along an original propagation direction;

the first linearly polarized light passing through the second reflective polarizer and the second linearly polarized light passing through the first reflective polarizer are reflected back to a corresponding light extraction region.

\* \* \* \* \*